March 30, 1965  J. O. HRUBY, JR  3,175,767
ORNAMENTAL WATER FOUNTAINS
Filed Jan. 28, 1963  2 Sheets-Sheet 1

INVENTOR.
JOHN O. HRUBY, JR.

March 30, 1965   J. O. HRUBY, JR   3,175,767
ORNAMENTAL WATER FOUNTAINS
Filed Jan. 28, 1963   2 Sheets-Sheet 2

INVENTOR.
JOHN O. HRUBY, JR.

United States Patent Office 3,175,767
Patented Mar. 30, 1965

3,175,767
ORNAMENTAL WATER FOUNTAINS
John O. Hruby, Jr., Burbank, Calif., assignor, by mesne assignments, to Rain Jet Corp., Burbank, Calif.
Filed Jan. 28, 1963, Ser. No. 254,398
7 Claims. (Cl. 239—17)

This invention relates generally to improvements in rotary devices for producing ornamental water fountains.

The fountain devices of this invention belong in a general class which includes those of my pending patent application, Serial No. 113,538, filed May 29, 1961, now Patent No. 3,081,036. As is the case for the instant invention, the fountain devices of said patent application comprise a tubular stem which is caused to gyrate around in a tubular body with the axis of the stem being inclined with respect to the axis of the body and with the stem tracing a geometric surface called a hyperboloid of one sheet. Such gyration of the tubular stem is effected by rotation of water in the body, the rotating water being hereinafter referred to as driving water to distinguish the same from that which passes upwardly through the stem. The water from the stem produces a central spire or spires through a distributor head on the upper end of the stem, and the driving water, also affected by the distributor head, produces a peripheral spray portion of the fountain around the central spire or spires.

To obtain appreciable rotary action, a substantial amount of the water flowing through the fountain device is utilized as driving water. Though it is a relatively simple matter to control the height and size of the stream or streams from the stem as by determining an appropriate size for the stem orifices, it is the driving water which presents a control problem for cases where it is desired to substantially reduce the size of the peripheral spray portion of the fountain or even to eliminate it from the fountain display.

The fountain devices of the instant invention comprise means for controlling the driving water in a way such that the peripheral portion of the water fountain will be substantially reduced in size and for some embodiments practically excluded from view.

In the following part of this specification, the details of construction and mode of operation of three preferred embodiments of the invention are described with reference to the accompanying drawing, in which.

Figures 1, 2, 3:
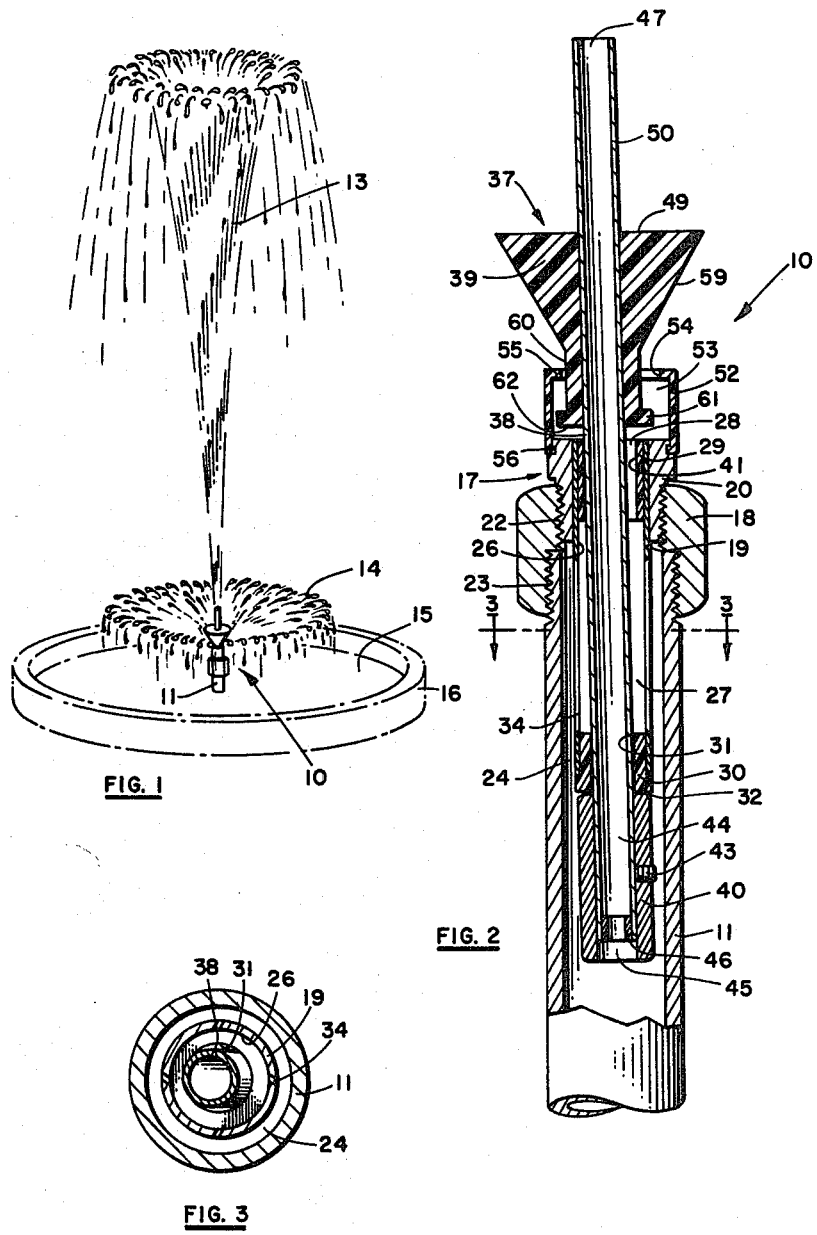
FIG. 1 is a perspective view of a first embodiment of a fountain device of this invention and of a water fountain produced by the device.
FIG. 2 is a central vertical section on a larger scale through the device.
FIG. 3 is a slightly enlarged cross-section through the device taken upon the plane indicated by line 3—3 on FIG. 2.

Referring to the drawing in greater detail, the illustrated fountain device of FIGS. 1–3 is designated generally by reference numeral 10. It receives water from a vertical riser pipe 11 upon which it is mounted. The device 10 is one designed to produce an ornamental fountain of water having a central spire 13 and a lower peripheral spray 14 around the central spire. The water droplets of the fountain fall upon the surface of water 15 in a basin 16.

Fountain device 10 comprises a hollow body 17 extending axially into the upper end of the riser 11, and a nipple 18 for securing the body upon the riser. The body 17 comprises a rigid tube 19 and a collar or nut 20 around the upper end of the tube, the tube being force-fitted or otherwise suitably secured in the collar. The collar is screw-threaded at 22 for securing the body in the nipple, the nipple being internally screw-threaded at 23 for mounting the fountain device upon the riser. The body tube 19 is of smaller outside diameter than the inside diameter of the riser to provide an annular space 24 around the body tube.

Numeral 26 designates the inside cylindrical surface of the body tube 19, such inside surface defining a body cavity or bore 27. An opening 28 in the upper part of the body is defined by an annular bearing 29 which is force-fitted in the upper end portion of the tube 19. An annular bearing 30 is force-fitted in the lower end of the body tube, the bearing 30 having a cylindrical bore 31 extending axially therethrough. The lower end face of the lower bearing 30 defines the lower end face 32 of the body 17. The bearings 29 and 30 are of laminated phenolic composition.

Formed in the side walls of the body tube 19 is a plurality of apertures 34 for admitting water into the body cavity from the riser 11. In the illustrated embodiments, these apertures are formed as narrow slits which extend longitudinally of the body 17. There are four such slits in the illustrated embodiments, they being evenly spaced apart around the body. These slits extend through the wall of the tube 19 at an angle with respect to the radii of the body cavity 27, thereby to cause water (driving water) in the body cavity to spiral around and pass upwardly through the opening 28.

The rotary and jet producing member of the fountain device 10 is designated generally by reference numeral 37. It comprises a tubular stem 38, an annular deflector 39 proximate the upper end of the stem, and a collar 40 on the lower end of the stem. The stem is arranged longitudinally in the body cavity 27 and extends upwardly through the opening 28 and downwardly through the lower end opening 31 of the body. The stem is substantially smaller in outside diameter than the opening 28. The lower end opening 31 is only slightly larger in diameter than the stem, enough so that the lower end opening will accommodate rotation of the stem on its longitudinal axis and sufficient inclination of the stem with respect to the axis of the body cavity to permit engagement of the stem with the upper end of the inside surface 41 of the upper bearing 29 which defines the opening 28.

The rotary member 37 of the embodiment of FIGS. 1–3 is movable axially in the body 17. The collar 40 limits the extent of upward movement of the rotary member through engagement of the collar against the lower annular end surface 32 of the body. The collar 40 is secured upon the lower end of the stem by means of a set screw 43. Numeral 44 designates the axially extending passage or bore of the stem. The stem has an inlet opening 45 for reception of water from the riser 11, the inlet opening being defined by the inside of a restrictor sleeve 46 which is force-fitted within the lower end of the stem. The outlet opening or orifice of the stem 38 is at its upper end for forming the conical central spire 13 of the fountain.

In operation the fountain device 10 is similar in certain aspects to the lawn sprinklers of U. S. Patent No. 2,639,191. A review of the explanation of the mode of operation of the sprinklers of said patent will make it clear that for the fountain device of the instant invention, the swirl of water around and upwardly in the body cavity 27, because of the slant of the water inlet apertures 34, will cause the rotary member 37 to gyrate around in the body with the axis of the stem 28 being inclined with respect to the axis of the body cavity 27. In being so gyrated, the stem 38 contacts the inside surface of the bearing 30 along an edge of which the stem rolls, whereby the stem is caused to rotate on its axis.

The fountain device 10 differs from a lawn sprinkler in that the outlet orifice 47 of the stem 38 is upwardly directed rather than laterally directed. The device 10 differs from the fountain device illustrated in the above-mentioned application Serial No. 113,538 in that the stem 38 extends beyond the upper end face 49 of the deflector 39 as an extended portion 50 of the stem, and the deflector 39 of the herein illustrated device 10 does not include any means for directing the driving water into distinct jets.

An important feature of this invention is its provision of means for reducing the force of the driving water from the opening 28 such that the lower peripheral spray 14 will be small in size. Such means, which characterizes the fountain devices of this invention, comprises an annular wall 52 at the upper end of the body 17 defining a cavity 53 of substantially larger cross-section than the opening 28. The cavity 53 is open at its upper end as a discharge opening 54 for the driving water around the stem, the opening 54 being defined by an inwardly extending annular flange 55. In the illustrated embodiment, the annular wall 52 is formed of plastics material and is secured around the nut 20 by having an annular ridge 56 on the inside of its lower end fitting into a complementary groove around the nut.

The annular deflector 39 of the illustrated embodiment is formed of plastics molded upon the outside of the stem so as to be secured against axial movement. The deflector has an inverted frusto-conical undersurface 59 the base of which is contiguous the periphery of the upper end face 49, a neck portion 60 of cylindrical outside surface, and an outwardly extending annular flange 61 at its lower end face 62. The annular flange 61 is of larger size than the opening 28 and is just small enough to be passed through the discharge opening 54 when assembling the fountain device. As the driving water from the cavity 27 passes upwardly through the opening 28, it strikes against the lower end face 62 of the deflector 39 where it is directed radially outward around the periphery of the flange 61 and thence upwardly through the discharge opening 54 around the neck portion 60 and thence is deflected outwardly by the frusto-conical surface 59. The inclination of the stem due to its gyratory motion and the relationship of parts is such that when the stem is inclined to its greatest extent shown in FIG. 2, the flange 61 still covers the opening 28. The flange 61 by being disposed in the stream of water from the upper end of the fountain body as an obstruction reduces the force of the driving water and thereby reduces the diameter of the peripheral spray 14 so that the peripheral spray portion 14 of the fountain display is of relatively inconsequential size compared with the central spire 13.

Figure 4:
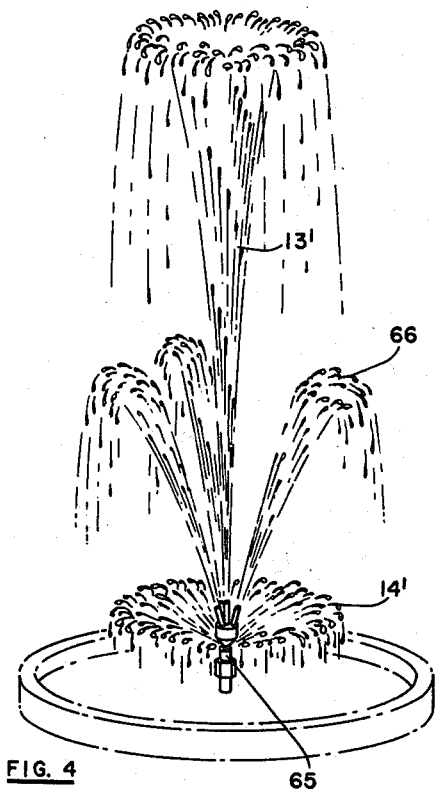
FIG. 4 is a perspective view of a second embodiment of a fountain device of this invention and of the water fountain produced by it.
Figure 6:
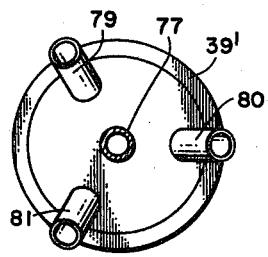
FIG. 6 is a top view of the second embodiment taken in the direction of arrows 6—6 on FIG. 5.
Figure 5:
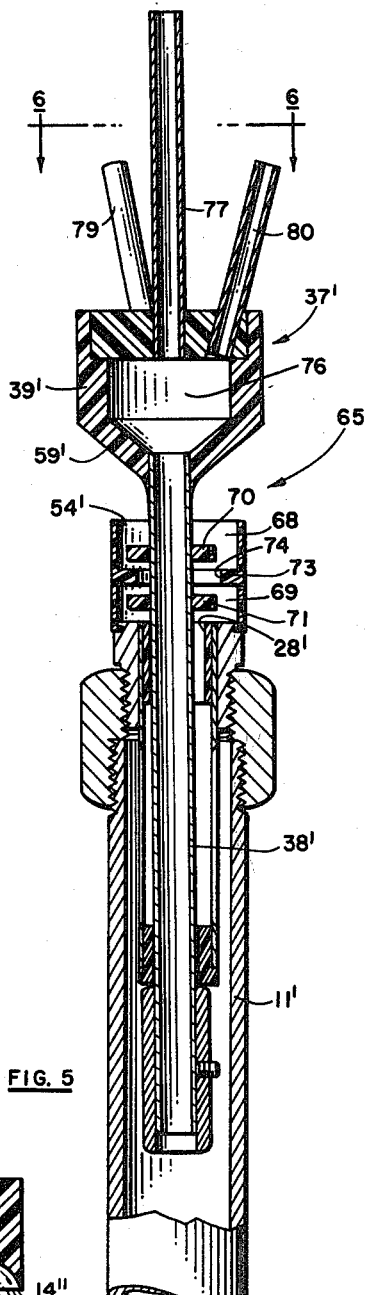
FIG. 5 is a central vertical section on a larger scale through the second embodiment.

Referring to FIGS. 4–6, the embodiment therein illustrated is designated generally by reference numeral 65. It is designed to produce an ornamental water fountain having a central spire 13', an intermediate group of sprays 66 and a lower peripheral spray 14'. The fountain device 65 differs further from that of device 10 in that the device 65 has a plurality of superimposed chambers 68 and 69 at its upper end. The component parts of the device 65 which correspond with those of the device 10 are designated by primed reference numerals, corresponding, respectively with those used for designating the component parts of device 10. The stem 38' of device 65 has two deflector annular rings 70 and 71 secured thereto and disposed in the chambers 68 and 69, respectively. The chambers 68 and 69 are separated from each other by a restrictor partition 73 defining an inside circular opening 74 of a size sufficient to allow the lower ring 71 to be passed therethrough when assembling the fountain device. Thus it is that the driving water from the body of the device 65 has its impact force reduced by the obstructions or restrictions 70, 71 and 73 whereby it follows a sinuous path from the opening 28' outwardly around the lower obstruction ring 71, thence inwardly to flow through the partition opening 74 around the stem, thence radially outward in the upper chamber 68 around the upper obstruction ring 70 to pass out through the discharge opening 54'. From the discharge opening 54' the driving water, being reduced in force, is deflected outwardly by the frusto-conical undersurface 59' of the deflector 39'.

The deflector head 39' differs from that of the device 10 in that the deflector head 39' contains a hollow 76 for distribution of water from the upper end of the stem 38' to a plurality of orifice defining tubes on the upper end of the rotary member 37'. More particularly, there is at tube 77 in axial alignment with the stem 38' and serving the same purpose as the extension portion 50 of the stem 38 of the device 10, i.e. to form the central spire 13'. In the case of device 65, such central tube 77 is of smaller cross-sectional area than its corresponding part 50 of the device 10. There are three orfiice defining tubes 79, 80 and 81 spaced uniformly apart circumferentially of the central tube 77, and these tubes 79, 80 and 81 are inclined to extend outwardly from the central orifice for forming the intermediate sprays 66.

Figure 7:
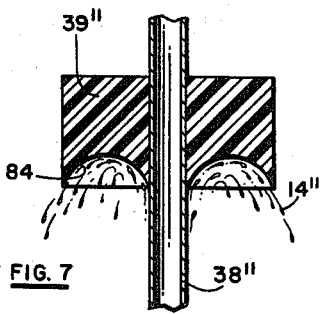
FIG. 7 is a central vertical section through the distributor head of the stem of a third embodiment.

Referring to FIG. 7, the annular deflector 39" shown therein is somewhat similar to that of the annular deflector 39 of the FIG. 2 embodiment, but in this instance, the undersurface of deflector 39" is not frusto-conical but instead is formed as an annular recess 84 whereby the driving water from the discharge opening of a fountain device, being reduced in impact as explained above, is directed downwardly to provide a peripheral spray portion 14" which, when viewed with respect to the size and disposition of a central spire 13, is practically excluded from view.

While this invention has herein been shown and described in what are conceived to be the most practical and preferred embodiments, it is recognizetd that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A water fountain device comprising a vertically extending water supply conduit having a water discharge opening at its upper end, an open-ended stem smaller than said opening and extending dowwardly therethrough, means responsive to flow of water in said conduit for rotating said stem about a vertical axis, a water deflecting head around said stem above said opening, and means including an annular projection secured to and extending circumferentially of the stem and positioned between said discharge opening and said rotating means for deflecting the water flowing upwardly around said stem along a sinuous path for reducing its force prior to flowing out through said discharge opening.

2. A device according to claim 1, in which the undersurface of said deflecting head flares outwardly and upwardly from the stem.

3. A device according to claim 1 in which the under surface of said deflecting head is an annular groove around the stem for deflecting the water from said discharge opening outwardly and downwardly around the device.

4. An ornamental fountain comprising a vertically extending water supply conduit having a water discharge opening at its upper end, a tubular stem smaller than said opening and extending downwardly therethrough, means responsive to flow of water in said conduit for rotating said stem about a vertical axis and for gyrating the stem with the axis of the stem being inclined, the stem having a water inlet opening at its lower end, a head on said stem above said discharge opening, the head having an outlet orifice for discharge of water from the stem, the undersurface of the head flaring outwardly from said stem to deflect water issuing from said discharge opening, and means defining a chamber in the upper end portion of said conduit and an annular projection secured to and extending circumferentially of the stem and disposed in said chamber for reducing the force of water to issue from said discharge opening.

5. A device for producing an ornamental fountain display, the device comprising a tubular body adapted to be secured within the upper end of a vertically extending water supply pipe, the body having a discharge opening at its upper end and an inlet aperture in the side wall of the body, with the edges which define said aperturre being inclined with respect to the radii of the inside of the body whereby water passing from said supply pipe into the body through said inlet aperture causes water in the body to swirl around in the body and pass upwardly through said discharge opening, a rotary member having a tubular stem and a deflector around the stem, the stem being smaller in cross-section than said discharge opening and extending downwardly therethrough into the body, the rotary member being rotatable on tis vertical axis and gyratable around in the body due to the swirl of water in said body, the stem having an inlet opening at its lower end, the deflector being secured upon the stem above said discharge opening for deflecting driving water which issues from said discharge opening outwardly with respect to the stem, the rotary member having means defining an upwardly extending orifice for outlet of water from the stem to form a central spire of the fountain display, the body having a plurality of annular projections extending inwardly toward the stem and being spaced apart axially from each other, and the stem having an annular projection around the stem and disposed between said annular projections of the body whereby driving water from said body is caused to flow along a sinuous path around the stem for reducing the force of the driving water to flow through said discharge opening as a lower peripheral spray deflected outwardly with respect to said central spire by the undersurface of said deflector.

6. A fountain device according to claim 5, wherein said rotary member has a plurality of orifice defining tubes to which water from said stem is distributed, one of said orifice defining tubes bein disposed axially of the rotary member for forming the central spire of the fountain display, the other of said orifice tubes being arranged in a circumferentially extending series around the axially disposed orifice tube for forming an intermediate pattern of the fountain display, said other orifice tubes being inclined upwardly and outwardly from said axially disposed orifice tube.

7. A fountain device according to claim 5, in which the number of annular projections around the outside of the stem below said discharge opening are two in number.

References Cited in the file of this patent
UNITED STATES PATENTS

| 2,320,964 | Yates | June 1, 1943 |
| 2,854,283 | Hruby | Sept. 30, 1958 |
| 3,030,028 | Hruby | Apr. 17, 1962 |
| 3,081,036 | Hruby | Mar. 12, 1963 |